(12) United States Patent
Huang

(10) Patent No.: US 12,543,235 B2
(45) Date of Patent: Feb. 3, 2026

(54) METHOD FOR ACTIVATING CONNECTION, DEVICE, SYSTEM AND STORAGE MEDIUM

(71) Applicant: SHENZHEN TRANSSION HOLDINGS CO., LTD., Guangdong (CN)

(72) Inventor: Junwei Huang, Guangdong (CN)

(73) Assignee: SHENZHEN TRANSSION HOLDINGS CO., LTD., Guangdong (CN)

(*) Notice: Subject to any disclaimer, the term of this patent is extended or adjusted under 35 U.S.C. 154(b) by 414 days.

(21) Appl. No.: 18/183,448

(22) Filed: Mar. 14, 2023

(65) Prior Publication Data
US 2023/0217523 A1 Jul. 6, 2023

Related U.S. Application Data

(63) Continuation of application No. PCT/CN2020/115071, filed on Sep. 14, 2020.

(51) Int. Cl.
H04W 76/19 (2018.01)
(52) U.S. Cl.
CPC ................. *H04W 76/19* (2018.02)
(58) Field of Classification Search
CPC ... H04W 76/19; H04W 68/005; H04W 76/27; H04W 76/15
See application file for complete search history.

(56) References Cited

U.S. PATENT DOCUMENTS

| 11,178,719 B2* | 11/2021 | Wu ....................... H04W 72/23 |
| 12,127,058 B2* | 10/2024 | Hong ................. H04W 36/0085 |
| 2017/0171903 A1* | 6/2017 | Kubota ................. H04W 48/16 |

(Continued)

FOREIGN PATENT DOCUMENTS

| CN | 109756994 A | 5/2019 |
| CN | 111294823 A | 6/2020 |

(Continued)

OTHER PUBLICATIONS

Extended Search Report issued on Sep. 20, 2023, in corresponding European Application No. 20952891.8, 13 pages.

(Continued)

*Primary Examiner* — Will W Lin
(74) *Attorney, Agent, or Firm* — Maier & Maier, PLLC

(57) ABSTRACT

A method for activating a connection, a device, a system, and a storage medium, the method including: a terminal device in an inactive state receives recovery configuration indication information, the recovery configuration indication information indicates that the terminal device recovers, does not recover, or partially recovers a radio resource control connection, and confirms, according to the recovery configuration indication information, whether to recover the radio resource control connection. By recovering or partially recovering the radio resource control connection according to the recovery configuration indication information, the embodiments can quickly activate the radio resource control connection between the terminal device in the inactive state and a network device, the data transmission delay is reduced, thereby complying with low-latency requirements of high-reliability and low-latency communication.

25 Claims, 6 Drawing Sheets

Receiving recovery configuration indication information, where the recovery configuration indication information indicates that the terminal device recovers, does not recover, or partially recovers a radio resource control connection — S20

Confirming, according to the recovery configuration indication information, whether to recover the radio resource control connection — S40

(56) References Cited

U.S. PATENT DOCUMENTS

| | | | |
|---|---|---|---|
| 2019/0342936 A1* | 11/2019 | Wu | H04W 76/10 |
| 2019/0356460 A1* | 11/2019 | Tsuboi | H04W 48/08 |
| 2020/0267631 A1 | 8/2020 | Yilmaz et al. | |
| 2021/0168893 A1 | 6/2021 | Ai et al. | |
| 2021/0251032 A1* | 8/2021 | Wang | H04W 76/15 |
| 2021/0321314 A1* | 10/2021 | Ozturk | H04W 74/0808 |
| 2022/0046747 A1* | 2/2022 | Da Silva | H04W 52/0229 |
| 2022/0086670 A1* | 3/2022 | Kim | H04W 76/20 |
| 2022/0117022 A1* | 4/2022 | Cheng | H04W 76/19 |
| 2022/0287133 A1* | 9/2022 | Hsieh | H04W 76/27 |
| 2023/0020533 A1* | 1/2023 | Wang | H04L 5/0064 |
| 2023/0164867 A1* | 5/2023 | Cheng | H04W 76/27 370/252 |
| 2023/0164871 A1* | 5/2023 | Jung | H04W 24/08 370/328 |
| 2024/0032135 A1* | 1/2024 | Cheng | H04W 24/08 |

FOREIGN PATENT DOCUMENTS

| | | |
|---|---|---|
| EP | 3836735 A1 | 6/2021 |
| KR | 1020210042328 A | 4/2021 |
| WO | 2020030110 A1 | 2/2020 |
| WO | 2020167170 A1 | 8/2020 |

OTHER PUBLICATIONS

CATT, "Direct CA or DC Activation and Deactivation", R2-1905880, May 13-17, 2019, 2 pages.

VIVO, "Configuration of Inactive State for MR-DC", R2-1905824, May 13-17, 2019, 4 pages.

International Search Report mailed Jun. 17, 2021, in International Application No. PCT/CN2020/115071, 5 pages.

Written Opinion mailed Jun. 17, 2021, in International Application No. PCT No. PCT/CN2020/115071, 4 pages.

ZTE Corporation Rapporteur, "Report on Email Discussion [1081155] [DCCA] MCG SCell and SCG configuration with RRC Resume (ZTE)," 3GPP TSG-RAN WG2 Meeting, #109-e, R2-2000249, Mar. 6, 2020.

Office Action issued on Jun. 21, 2024, in corresponding Indian Application No. 202317018517, 7 pages.

* cited by examiner

METHOD FOR ACTIVATING CONNECTION, DEVICE, SYSTEM AND STORAGE MEDIUM

CROSS-REFERENCE TO RELATED APPLICATIONS

This disclosure is a continuation of International Application No. PCT/CN2020/115071, filed on Sep. 14, 2020, the disclosure of which is hereby incorporated by reference in its entirety.

TECHNICAL FIELD

Embodiments of the present disclosure relates to the field of communications technologies, and in particular, to a method for activating a connection, a device, a system and a storage medium.

BACKGROUND

In a current communication system, such as LTE (Long Term Evolution) system or NR (New Radio) system, a terminal device in an inactive state may receive a paging from a network device when it no longer transmits data with the network device. In addition, in some implementations, both the network device and the terminal device generally store an RRC (Radio Resource Control) connection established by the terminal device and the configuration information of data radio bearer. In this way, when the terminal device has data transmission requirements again, it can establish the RRC connection through a random access process, and then re-enable the above configuration information through an RRC recovery signaling to activate the connection for data transmission.

However, the above process of activating connection has a problem of delay, which does not meet the low delay requirements of URLLC (Ultra Reliable Low Latency Communications).

The foregoing description is to provide general background information and does not necessarily constitute the prior art.

SUMMARY

Embodiments of the present application provide a method for activating a connection, a device, a system and a storage medium to realize a fast activating connection.

In a first aspect, an embodiment of the present application provides a method for activating a connection, which is applied to a terminal device in an inactive state, including the following steps:
S20: receiving recovery configuration indication information, where the recovery configuration indication information indicates that the terminal device recovers, does not recover, or partially recovers a RRC (Radio Resource Control) connection;
S40: confirming, according to the recovery configuration indication information, whether to recover the radio resource control connection.

In a possible implementation, the above confirming, according to the recovery configuration indication information, whether to recover the radio resource control connection includes:
confirming whether to recover the radio resource control connection in a recovery process of the radio resource control connection; or
confirming whether to recover the radio resource control connection in a random access process.

In a possible implementation, the receiving the recovery configuration indication information includes:
receiving the recovery configuration indication information in a recovery process of the radio resource control connection; or
receiving the recovery configuration indication information in a random access process; or
receiving the recovery configuration indication information in a paging process.

In a possible implementation, further including:
recovering the radio resource control connection.

In a possible implementation, after the recovering the radio resource control connection, it further includes at least one of the following:
if there is uplink data needs to be transmitted, sending the uplink data;
receiving downlink data.

In a second aspect, an embodiment of the present application provides a method for activating a connection, which is applied to a network device, including the following steps:
S10: sending recovery configuration indication information, where the recovery configuration indication information indicates that a terminal device recovers, does not recover, or partially recovers a radio resource control connection, and the terminal device is in an inactive state;
S30: confirming, according to the recovery configuration indication information, whether to recover the radio resource control connection.

In a possible implementation, the above confirming, according to the recovery configuration indication information, whether to recover the radio resource control connection includes:
confirming whether to recover the radio resource control connection in a recovery process of the radio resource control connection; or
confirming whether to recover the radio resource control connection in a random access process.

In a possible implementation, the sending the recovery configuration indication information includes:
sending the recovery configuration indication information in a recovery process of the radio resource control connection; or
sending the recovery configuration indication information in a random access process; or
sending the recovery configuration indication information in a paging process.

In a possible implementation, further including:
recovering the radio resource control connection.

In a possible implementation, after the recovering the radio resource control connection, it further includes at least one of the following:
if there is downlink data needs to be transmitted, sending the downlink data;
receiving uplink data.

In a third aspect, an embodiment of the present application provides an apparatus for activating a connection, which is applied to a terminal device in an inactive state, including:
a transceiver module, configured to receive recovery configuration indication information, where the recovery configuration indication information indicates that a terminal device recovers, does not recover, or partially recovers a radio resource control connection;

a processing module, configured to confirm, according to the recovery configuration indication information, whether to recover the radio resource control connection.

In a possible implementation, the processing module is specifically configured to:
confirm whether to recover the radio resource control connection in a recovery process of the radio resource control connection;
or, confirm whether to recover the radio resource control connection in a random access process.

In a possible implementation, the transceiver module receives the recovery configuration indication information includes:
receiving the recovery configuration indication information in a recovery process of the radio resource control connection; or
receiving the recovery configuration indication information in a random access process; or
receiving the recovery configuration indication information in a paging process.

In a possible implementation, the processing module is further configured to:
recover the radio resource control connection.

In a possible implementation, the transceiver module is further configured to:
after the processing module recovers the radio resource control connection, if there is uplink data needs to be transmitted, send the uplink data;
and/or, after the processing module recovers the radio resource control connection, receive downlink data.

In a fourth aspect, an embodiment of the present application provides an apparatus for activating a connection, which is applied to a network device, including:
a transceiver module, configured to send recovery configuration indication information, where the recovery configuration indication information indicates that a terminal device recovers, does not recover, or partially recovers a radio resource control connection, and the terminal device is in an inactive state;
a processing module, configured to confirm, according to the recovery configuration indication information, whether to recover the radio resource control connection.

In a possible implementation, the processing module is specifically configured to:
confirm whether to recover the radio resource control connection in a recovery process of the radio resource control connection;
and/or, confirm whether to recover the radio resource control connection in a random access process.

In a possible implementation, the transceiver module sends the recovery configuration indication information includes:
sending the recovery configuration indication information in a recovery process of the radio resource control connection; or
sending the recovery configuration indication information in a random access process; or
sending the recovery configuration indication information in a paging process.

In a possible implementation, the processing module is further configured to:
recover the radio resource control connection.

In a possible implementation, the transceiver module is further configured to:
after the processing module recovers the radio resource control connection, if there is downlink data needs to be transmitted, send the downlink data;
and/or, after the processing module recovers the radio resource control connection, receive uplink data.

On the basis of any of the above possible implementations:
Optionally, the recovery configuration indication information is carried by at least one of following ways:
a sub-header in a MAC PDU (Media Access Control Protocol Data Unit);
a CE (Control Element) in the media access control protocol data unit;
a RAR (Random Access Response);
a SDU (Service Data Unit).

The SDU may bear upper layer (RRC) control signaling, specifically including but not limited to RRCResume and RRCConnectionResume signaling. The SDU may bear the signaling of the communication between the terminal and a base station after a random access process.

Specifically, when the time point at which the recovery configuration indication information is received is in the random access process, and the SDU carries the recovery configuration indication information, the radio resource control connection is recovered after the random access process, for example, the radio resource control connection is recovered in the recovery process of the radio resource control connection; when the time point at which the recovery configuration indication information is received is in the random access process, and any one of the sub-header in the media access control protocol data unit, the control element in the media access control protocol data unit and the random access response carries the recovery configuration indication information, the radio resource control connection is recovered in the random access process; when the time point at which the recovery configuration indication information is received is in the recovery process of the radio resource control connection, the radio resource control connection is recovered in the recovery process of the radio resource control connection.

Optionally, the recovery configuration indication information is used to indicate at least one of the following:
a recovery of a connection with a master node;
a recovery of a secondary cell configured by a master node;
a recovery of a connection with a secondary node;
a recovery of a secondary cell configured by a secondary node.

Optionally, the recovery configuration indication information is used to indicate at least one of the following:
not to recover a connection with a master node;
not to recover a secondary cell configured by a master node;
not to recover a connection with a secondary node;
not to recover a secondary cell configured by a secondary node.

Optionally, the recovery configuration indication information is represented by at least one bit.

Optionally, at least one of the following is further included:
if a value of the bit is a first preset value, the recovery configuration indication information is used to indicate a recovery of the connection with the master node;
if the value of the bit is a second preset value, the recovery configuration indication information is used to indicate a recovery of the connection with the secondary node;

if the value of the bit is a third preset value, the recovery configuration indication information is used to indicate a recovery of the secondary cell configured by the master node;

if the value of the bit is a fourth preset value, the recovery configuration indication information is used to indicate a recovery of the secondary cell configured by the secondary node.

Optionally, at least one of the following is further included:

a first preset bit is used to indicate whether to perform a recovery of the connection with the master node;

a second preset bit is used to indicate whether to perform a recovery of the connection with the secondary node;

a third preset bit is used to indicate whether to perform a recovery of the secondary cell configured by the master node;

a fourth preset bit is used to indicate whether to perform a recovery of the secondary cell configured by the secondary node.

In a fifth aspect, an embodiment of the present application provides a communication device, including: a memory and a processor;

the memory is configured to store program instructions;
the processor is configured to call the program instructions in the memory to execute the method according to any one of the first aspect or the method according to any one of the second aspect.

It should be noted that the communication device in the fifth aspect may be a terminal device in an inactive state or a network device, or a chip of a terminal device or a chip of a network device.

In a sixth aspect, an embodiment of the present application provides a communication system, including:

a terminal device for implementing any one of the first aspect; and a network device for implementing any one of the second aspect.

In a seventh aspect, an embodiment of the present application provides a readable storage medium, having a computer program stored thereon; when the computer program is executed, the method according to any one of the first aspect or the method according to any one of the second aspect is implemented.

In an eighth aspect, an embodiment of the present application provides a program product, the program product includes a computer program, the computer program is stored in a readable storage medium, a processor can read the computer program from the readable storage medium, and the processor executes the computer program to implement the method according to any one of the first aspect or the second aspect.

The present application provides a method for activating connection, a device, a system, and a storage medium, the method includes: a terminal device in an inactive state receives recovery configuration indication information, the recovery configuration indication information indicates that the terminal device recovers, does not recover, or partially recovers a radio resource control connection, and confirms, according to the recovery configuration indication information, whether to recover the radio resource control connection. By recovering or partially recovering the radio resource control connection according to the recovery configuration indication information, the present application can quickly activate the radio resource control connection between the terminal device in the inactive state and a network device, the data transmission delay is reduced, thereby complying with low-latency requirements of high-reliability and low-latency communication.

BRIEF DESCRIPTION OF THE DRAWINGS

The accompanying drawings here are incorporated into the specification and constitute a part of the specification, show embodiments that comply with the present application, and are used to explain the principle of the present application together with the specification. In order to illustrate the technical solutions of the embodiments of the present application more clearly, the following will briefly introduce the accompanying drawings used in the description of the embodiments. Obviously, for those of ordinary skill in the art, other drawings can be obtained from these drawings without paying creative labor.

Figure 1A:
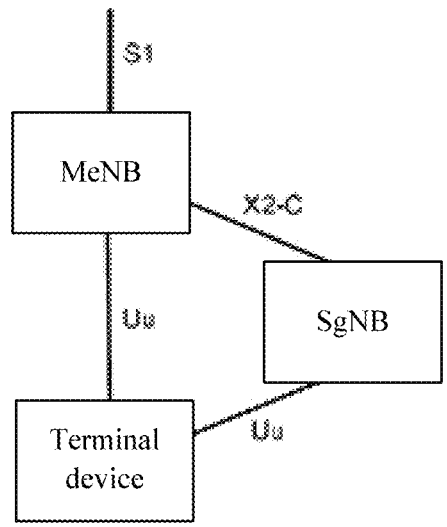
FIG. 1a is a schematic diagram of an EN-DC scenario.

The realization of the purpose, functional characteristics, and advantages of the present application will be further illustrated in conjunction with the embodiments and with reference to the accompanying drawings. Through the above accompanying drawings, the specific embodiments of the present application have been shown, which will be described in more detail later. These accompanying drawings and text descriptions are not intended to limit the scope of the concept of the present application in any way, but to illustrate the concept of the present application for those skilled in the art by referring to specific embodiments.

DETAILED DESCRIPTION OF THE EMBODIMENTS

The exemplary embodiments will be described in detail here, and examples thereof are shown in the drawings. When the following description refers to the drawings, unless otherwise represented, the same numbers in different drawings represent the same or similar elements. The implementations described in the following exemplary embodiments do not represent all implementations consistent with the present application. On the contrary, they are merely examples of apparatuses and methods consistent with some aspects of the application as detailed in the appended claims.

In addition, the step signs involved in the embodiments of the present application, such as S10, S30, etc., are used to express the corresponding steps more clearly, and do not constitute a substantial restriction on the order. Those skilled in the art may execute S30 first and then execute S10, etc. during specific implementation, but these should be within the protection scope of the present application.

It should be noted that, in this description, the terms "include", "comprise" or any other variants thereof are intended to cover non-exclusive inclusion, so that a process, method, object or apparatus including a series of elements not only includes those elements, but also include other elements that are not explicitly listed, or include elements inherent to the process, method, object, or apparatus. In a case of that there are no more restrictions, the element defined by the sentence "including a . . . " does not exclude the existence of other same elements in the process, method, object, or apparatus that includes the element.

It should be understood that although the terms "first", "second", "third", etc. may be used herein to describe various information, the information should not be limited to these terms. These terms are only used to distinguish the same type of information from each other. For example, without departing from the scope of this description, a first information may also be referred to as a second information, and similarly, the second information may also be referred to as the first information. Depending on the context, the word "if" as used herein may be interpreted as "when" or "as" or "in response to determination". Furthermore, as used herein, singular forms "a", "an" and "the" are intended to also include plural forms, unless the context instructs to the contrary. It should be further understood that the terms "contain" and "include" indicate a presence of the described features, steps, operations, elements, components, items, categories, and/or groups, but do not exclude a existence, appearance or addition of one or more other features, steps, operations, elements, components, items, categories, and/or groups. The terms "or" and "and/or" used herein are interpreted as inclusive or mean any one or any combination. Therefore, "A, B or C" or "A, B and/or C" means "any of the following: A; B; C; A and B; A and C; B and C; A, B and C". An exception to this definition will only occur when the combination of elements, functions, steps or operations is inherently mutually exclusive in some way.

The terms involved in the embodiments of the present application is explained first:

DC (Dual Connectivity): refers to that a terminal device uses the same radio access technology to access to two different network devices; or, a terminal device uses two different radio access technologies to simultaneously access a network device or two network devices. The dual connectivity includes: EN-DC (EUTRA-NR Dual Connectivity) and MR-DC (Multi-Radio Dual Connectivity).

FIG. 1a is a schematic diagram of an EN-DC scenario. As shown in FIG. 1a, a terminal device simultaneously accesses two base stations: MeNB and SgNB through an interface Uu. Specifically, the MeNB is a 4G base station that provides S1-MME connections for the terminal device, it connects to a 4G core network as a control plane anchor and undertakes all control plane functions, so it is also called "MN (Master Node)"; SgNB is a 5G base station, and there is no control plane link directly connected to a core network, there is the control plane link called X2-C between SgNB and MeNB, SgNB does not undertake the control plane function, and an interaction with the control plane of the core network depends on MeNB, so it is called "SN (Secondary Node)".

Figure 1B:
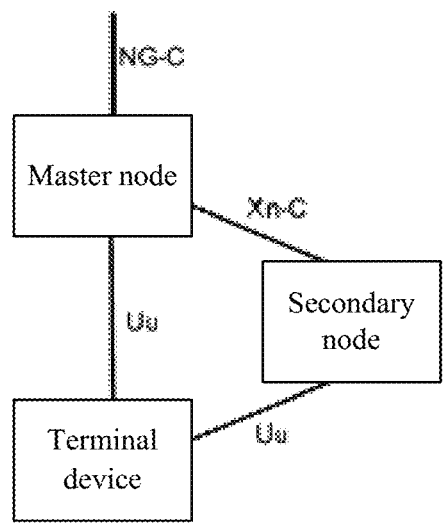
FIG. 1B is a schematic diagram of a multi-radio dual-connection scenario.

FIG. 1B is a schematic diagram of a multi-radio dual-connection scenario. As shown in FIG. 1B, a terminal device is configured to access two different nodes through an interface Uu, and use resources provided by the two different nodes, one node provides new radio access, and another node provides E-UTRA or new radio access. One node acts as a master node, and another node acts as a secondary node. There is a control plane link called Xn-C between the master node and the secondary node, and at least the master node is connected to a core network through an interface NG-C.

The connection established between the terminal device and the master node is called a MCG (Master Cell Group), and the connection established between the terminal device and the secondary node is called a SCG (Secondary Cell Group).

CA (Carrier Aggregation): refers to that the terminal device communicates with a network device through a PCC (Primary Component Carrier) and at least one SCC (Secondary Component Carrier). The network device may be an eNB in an LTE (Long Term Evolution) system or a base station in a new radio system. The primary component carrier is also called Pcell (Primary Cell, primary carrier), and the secondary component carrier is called Scell (Secondary Cell, secondary carrier).

RA (Random Access): refers to a process from the terminal device sending a random access preamble to try to access the network device to the terminal device establishing a basic signaling connection with the network device. The terminal device may initiate the random access in a variety of possible scenarios. For example, after a state of the terminal device is switched from an idle state to a connected state, the random access is initiated in a process of the terminal device and the network device establish a wireless link; or the random access is initiated when the state of the terminal device is switched from an inactive state to the connected state, and the like.

The random access involved in the embodiments of the present application may include the two-step random access (also referred to as 2-step RA) and the four-step random access (also referred to as 4-step RA). For ease of understanding, the process of the two-step random access and the four-step random access are respectively described in detail in the following.

Figure 2:
FIG. 2 is a schematic flow diagram of a two-step random access.

FIG. 2 is a schematic flow diagram of the two-step random access. Referring to FIG. 2, the two-step random access may include:

S201, the terminal device sends MsgA to the network device.

MsgA includes random an access preamble and a payload.

S202, the network device sends MsgB to the terminal device.

MsgB may be a contention resolution, a fallback indication, or a backoff indication, etc.

Figure 3:
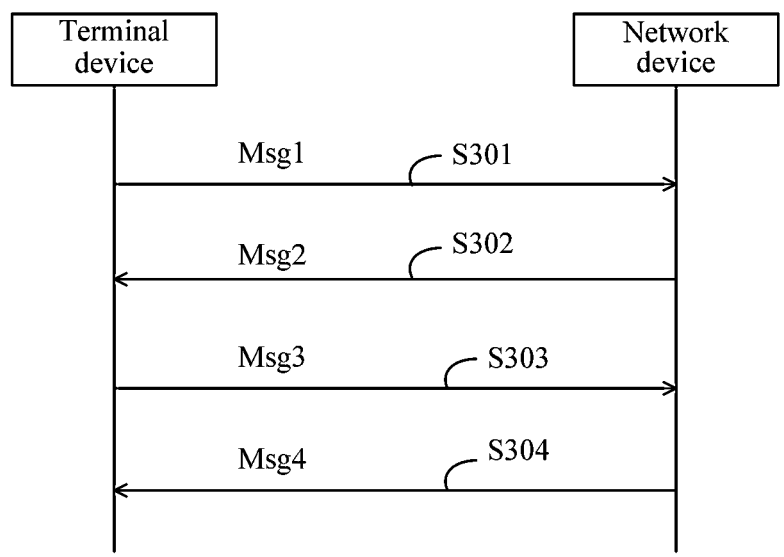
FIG. 3 is a schematic flow diagram of a four-step random access.

FIG. 3 is a schematic flow diagram of the four-step random access.

Referring to FIG. 3, the four-step random access may include:

S301, the terminal device sends Msg1 to the network device.

Msg1 includes a random access preamble, and the random access preamble may also be referred to as a random access preamble sequence, or a preamble, or a preamble sequence.

S302, the network device sends Msg2 to the terminal device.

Msg2 may be a random access response and/or a back-off indication. The back-off indication is used to indicate a back-off time for retransmitting Msg1.

For CFRA (Contention Free Random Access), after the terminal device successfully receives the Msg2, the random access process ends. For CBRA (Contention Based Random Access), after the terminal device successfully receives the Msg2, it needs to continue to send an Msg3 and receive an Msg4.

S303, the terminal device sends Msg3 to the network device.

Msg3 is a first scheduled transmission in the random access process, and a payload is sent.

S304, the network device sends Msg4 to the terminal device.

Msg4 is used to indicate whether the terminal device successfully accesses the network device. The Msg4 has a role of resolving competition conflicts. Taking an initial access as an example, the conflict resolution is that the terminal device receives a PDSCH (Physical Downlink Shared Channel) of Msg4 and matches a CCCH (Common Control Channel) service data unit (SDU) in the physical downlink shared channel.

Inactive state: after the terminal device accesses a network and completes the data transmission, the network device does not directly let the terminal device release the radio resource control connection to enter the idle state, but the network device configures the terminal device to enter the inactive state. After the terminal device enters the inactive state, it does not perform data transmission with the network device, but can periodically receive a paging from the network device. The network device retains a configuration of the radio resource control connection established by the terminal device, a configuration of a bearer, a security configuration, and a parameter configuration related to a n2 interface (an interface between a 5G core network and the base station) and the terminal device, for example, the master node configures a master cell group and its secondary cell (also called "MCG Scell"), the secondary node also configures a secondary cell group and its secondary cell (also called "SCG Scell"), etc. The terminal device also needs to save the configuration of radio resource control connection, the configuration of the bearer and the security configuration, etc. Since both the terminal device and the network device have the radio resource control connection configuration parameters of the terminal device, the terminal device that enters the inactive state may use the saved radio resource control connection configuration parameters to quickly access the network device for data transmission when there is data transmission. At present, the network device indicates the terminal device to enter the inactive state through a RRC release signaling.

Recovery process of radio resource control (connection): refers to a process in which the terminal device in the inactive state re-accesses to the network device and returns to the connected state.

At present, when the terminal device in the inactive state has data transmission requirements again, the radio resource control connection is established through the random access procedure, and then the above configuration information stored in the terminal device is re-enabled through a radio resource control recovery signaling, then a connection can be activated for the data transmission. However, the process of activating the connection does not comply with the low-latency requirements of high-reliability and low-latency communication.

Based on the above problems, the present application provides a method for activating a connection, a device, a system, and a storage medium, by advancing the recovery of the radio resource control connection to the random access process, the radio resource control connection can be recovered more quickly, thereby complying with the low-latency requirements of high-reliability and low-latency communication.

Figures 4, 5:
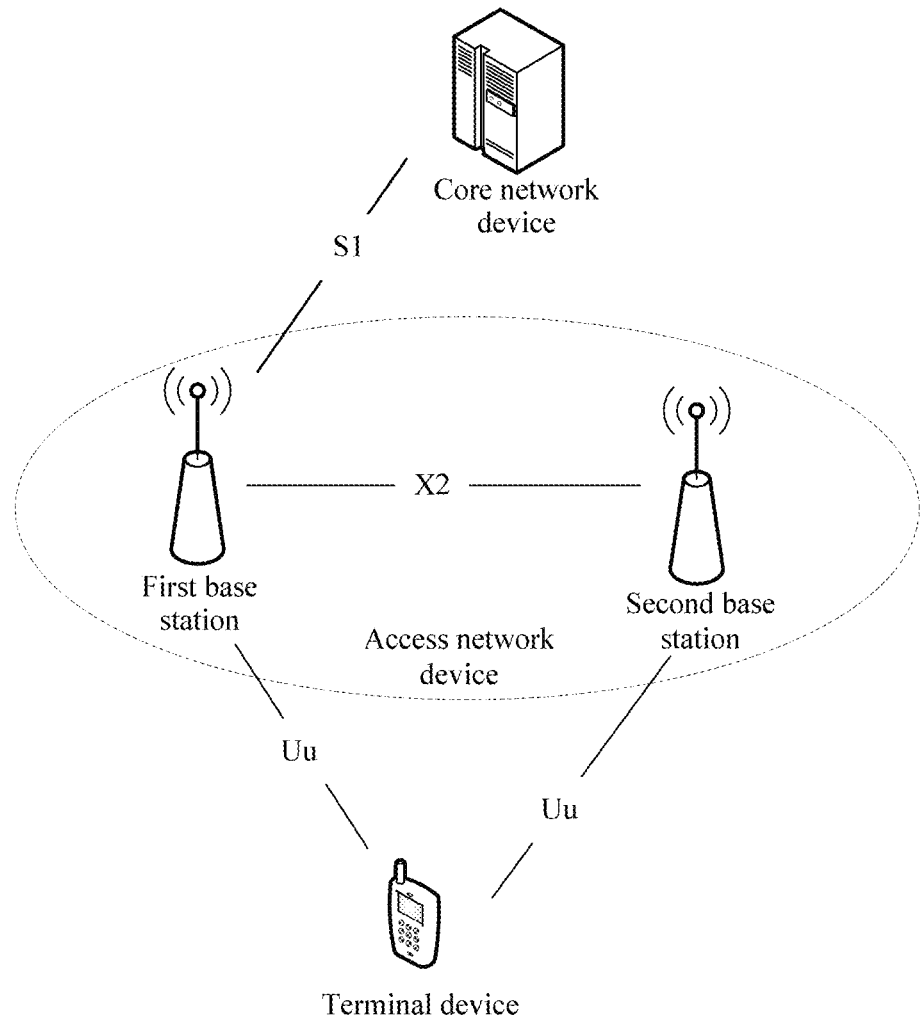
FIG. 4 is an schematic architecture diagram of a communication system according to an embodiment of the present application.
FIG. 5 is a flowchart of a method for activating a connection according to an embodiment of the present application.

The method for activating a connection provided in the embodiment of the present application may be applicable to the schematic architecture diagram of the communication system shown in FIG. 4. As shown in FIG. 4, the communication system includes: a core network device, an access network device, and terminal device. The core network device includes: a MME (Mobility Management Entity) and a SGW (Serving GateWay), and the access network device includes: a first base station and a second base station. Exemplarily, the first base station is an eNB (Evolved NodeB) in a long-term evolution system, and the second base station is a base station of a new radio system. In a scenario shown in FIG. 1, the first base station and the second base station share the core network device, where the first base station and the core network device are connected through an interface S1, and the first base station and the second base station are connected through an interface X2, the terminal device simultaneously accesses the first base station and the second base station through the interface Uu. Of course, in other scenarios, the first base station and the second base station may also have their own independent core network device, which is not limited in the embodiments of the present application.

It should be noted that, the communication system shown in FIG. 4 can be applied to different network standards, for example, it can be applied to network standards, such as, a GSM (Global System of Mobile communication), a CDMA (Code Division Multiple Access), a WCDMA (Wideband Code Division Multiple Access), TD-SCDMA (Time Division-Synchronous Code Division Multiple Access), a long-term evolution system and a future 5G network standards. Optionally, the above communication system may be a system in a scenario of high-reliability and low-latency communication in a 5G communication system.

The terminal device may be a wireless terminal device or a wired terminal device. The wireless terminal device may refer to a device with a wireless transceiver function, which may be deployed on land, including indoor or outdoor, handheld or vehicle-mounted; it may also be deployed on the water (such as ships, etc.); it may also be deployed in the air (such as airplanes, balloons and satellites, etc.). The terminal device may be a mobile phone, a tablet, a computer with a wireless transceiver function, a VR (Virtual Reality) terminal device, an AR (Augmented Reality) terminal device, a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, a wearable device, etc., which are not limited here. It can be understood that, in the embodiment of the present application, the terminal device may also be referred to as a UE (User Equipment), a system, a subscriber unit, a subscriber station, a mobile station, a mobile, a remote station, a remote terminal, an access terminal, a user terminal or a user agent, which are not limited here.

The technical solutions of the embodiment of the present application and how the technical solutions of the present application solve the above technical problems will be described in detail below with specific embodiments. The following specific embodiments may be combined with each other, and the same or similar concepts or processes may not be repeated in some embodiments. The embodiment of the present application will be described below in conjunction with the accompanying drawings.

FIG. 5 is a flowchart of a method for activating a connection according to an embodiment of the present application. The embodiment of the present application provides a method for activating a connection, which is applied to the terminal device described above, and the terminal device is in an inactive state. As shown in FIG. 5, the method of this embodiment includes the following steps:

S20: receiving recovery configuration indication information, where the recovery configuration indication information indicates that the terminal device recovers, does not recover, or partially recovers a radio resource control connection.

S40: confirming, according to the recovery configuration indication information, whether to recover the radio resource control connection.

In order to adapt to low-latency requirements of high-reliability and low-latency communication, for the recovery of the radio resource control connection, the embodiment of the present application sets a preset rule for reference when the terminal device recovers the radio resource control connection. Exemplarily, the preset rule may be specifically the timing of recovering the radio resource control connection.

Figure 6:
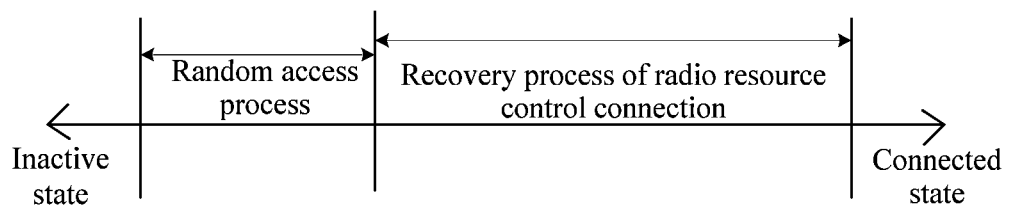
FIG. 6 is a schematic diagram of stages of a terminal device from an inactive state to a connected state according to an embodiment of the present application.

Specifically, referring to FIG. 6, the terminal device needs to go through the following two stages from the inactive state to a connected state to perform normal data transmission:

1. a random access process;
2. a process of re-enabling the above-mentioned configuration information stored in the terminal device via the radio resource control recovery signaling, that is, a recovery process of the radio resource control connection.

The timing of recovering the radio resource control connection may be any time in the above two stages.

It should be clarified that, the recovering the radio resource control connection in the present application refers to re-enabling a configuration of the radio resource control connection, a configuration of a bearer and a security configuration and other configuration information stored in the terminal device to activate a connection for data transmission.

In the method for activating a connection provided by the embodiment of the present application, a terminal device in an inactive state receives a recovery configuration indication information, the recovery configuration indication information indicates that the terminal device recovers, does not recover, or partially recovers a radio resource control connection, further, the terminal device confirms, according to the recovery configuration indication information, whether to recover the radio resource control connection. By recovering or partially recovering the radio resource control connection according to the recovery configuration indication information, the embodiment of the present application can quickly activate the radio resource control connection between the terminal device in the inactive state and a network device, the data transmission delay is reduced, thereby complying with low-latency requirements of high-reliability and low-latency communication.

On the basis of the above embodiment, exemplarily, the confirming, according to the recovery configuration indication information, whether to recover the radio resource control connection may include:

confirming whether to recover the radio resource control connection in the recovery process of the radio resource control connection; or confirming whether to recover the radio resource control connection in the random access process.

In an actual application process, when the terminal device in the inactive state needs to transmit data, it needs to return to the connected state again, that is, return to the connected state from the inactive state. At this time, the terminal device needs to initiate the random access process first. In the random access process or the recovery process of the radio resource control connection, for example, the base station and other network devices send the recovery configuration indication information to the terminal device, and the recovery configuration indication information is used to indicate the terminal device which connections to recover. The terminal device may recover the radio resource control connection in the recovery process of the radio resource control connection. Therefore, after the recovery process of the radio resource control connection is completed, the terminal device and the network device such as the base station may perform data transmission.

Or, when the terminal device in the inactive state needs to transmit data, it needs to return to the connected state again, that is, return from the inactive state to the connected state. At this time, the terminal device needs to initiate the random access process first. In the random access process, the network device such as the base station sends recovery configuration indication information to the terminal device, and the recovery configuration indication information is used to indicate the terminal device which connections to recover. The terminal device may recover the radio resource control connection in the random access process. Therefore, after the random access process is completed, the terminal device and the network device such as the base station may perform data transmission, which speeds up a connection establishment time and reduces the time delay of data interaction.

It can be known from the above description that, the terminal device receives the recovery configuration indication information may include: receiving the recovery configuration indication information in the recovery process of the radio resource control connection; or receiving the recovery configuration indication information in the random access process; or receiving the recovery configuration indication information in a paging process, which depends on actual needs, and which is not limited in the present application.

In the random access process, after the radio resource control connection is recovered, data transmission may be performed between the terminal device and the network device. Specifically, after the recovering the radio resource control connection, the method for activating connection further includes at least one of the following:

if there is uplink data needs to be transmitted, sending the uplink data;

receiving downlink data.

When the terminal device has the uplink data to be transmitted, the uplink data is sent to the network device; and/or the terminal device receives the downlink data sent by the network device.

In this embodiment, the radio resource control connection can be recovered in the random access process to perform data transmission, thereby reducing a time delay of the data transmission, improving data transmission efficiency, and meeting the low-latency requirements of high-reliability and low-latency communication.

Figure 7:
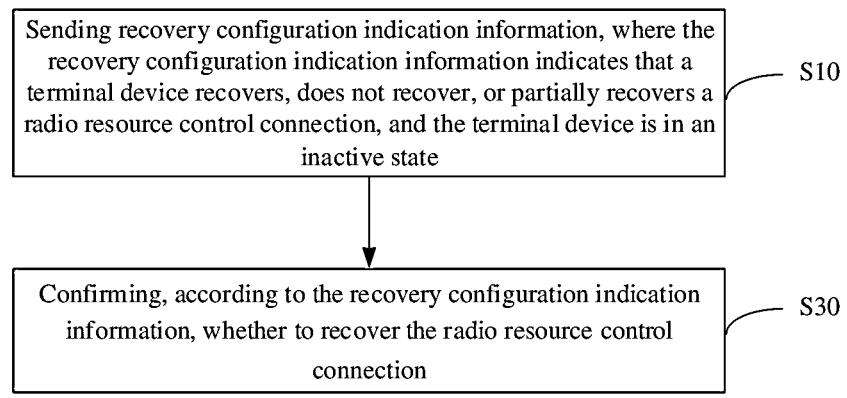
FIG. 7 is a flowchart of a method for activating a connection according to another embodiment of the present application.

Corresponding to the steps performed by the terminal device, as shown in FIG. 7, the steps performed by the network device include:

S10, sending recovery configuration indication information, where the recovery configuration indication information indicates that a terminal device recovers, does not recover, or partially recovers a radio resource control connection, and the terminal device is in an inactive state.

S30, confirming, according to the recovery configuration indication information, whether to recover the radio resource control connection.

With reference to the above embodiment, the network device confirms whether to recover the radio resource control connection in accordance with the preset rule, which is similar to the related description of the terminal device confirming whether to recover the radio resource control connection in accordance with the preset rule, and will not be repeated here.

Similar to the terminal device receives the recovery configuration indication information, the network device sends the recovery configuration indication information may include:

sending the recovery configuration indication information in the recovery process of the radio resource control connection; or sending the recovery configuration indication information in the random access process; or sending the recovery configuration indication information in a paging process.

In some embodiments, for the terminal device in an inactive state, the network device may have downlink data that needs to be transmitted to the terminal device. In this case, since the terminal device in the inactive state cannot perform normal data transmission with the network device, but can receive a paging message, the network device can carry the recovery configuration indication information through the paging message. Corresponding to the above steps, step S10 may include: sending the paging message. Correspondingly, step S20 may include: receiving the paging message. In this way, after receiving the paging message, the terminal device can quickly recover a configuration related to the radio resource control connection in the random access process, and activate the radio resource control connection.

In addition, after the recovering the radio resource control connection, the method for activating a connection further includes: if there is downlink data needs to be transmitted, sending the downlink data; and/or, receiving uplink data.

It should be understood that, the steps performed by the network device correspond to the steps performed by the terminal device in the above-mentioned terminal device-side embodiment. Therefore, beneficial effects corresponding to the terminal device-side embodiment can be achieved, which will not be repeated here.

In the following, carrying ways and specific meanings of the recovery configuration indication information are introduced.

1. Regarding the carrying ways of the recovery configuration indication information, optionally, the recovery configuration indication information can be carried in at least one of the following ways:
   a radio resource control signaling;
   a sub-header in a media access control protocol data unit;
   a control element in the media access control protocol data unit;
   a random access response;
   a service data unit;
   and the like.

The service data unit may bear control signaling or data. For example, the layer three (RRC) signaling may be used to bear the control signaling; the data may be downlink data.

Optionally, in an implementation, the recovery configuration indication information may be carried in any of the following ways:

1. the recovery configuration indication information is carried through the sub-header in the media access control protocol data unit;
2. the recovery configuration indication information is carried through the control element in the media access control protocol data unit;
3. the recovery configuration indication information is carried through the random access response;
4. the recovery configuration indication information is carried through the service data unit;
5. the recovery configuration indication information is carried through the sub-header in the media access control protocol data unit and the control element in the media access control protocol data unit;
6. the recovery configuration indication information is carried through the sub-header in the media access control protocol data unit and the random access response;
7. the recovery configuration indication information is carried through the sub-header in the media access control protocol data unit and the service data unit;
8. the recovery configuration indication information is carried through the control element in the media access control protocol data unit and the random access response;
9. the recovery configuration indication information is carried through the control element in the media access control protocol data unit and the service data unit;
10. the recovery configuration indication information is carried through the random access response and the service data unit;
11. the recovery configuration indication information is carried through the sub-header in the media access control protocol data unit, the control element in the media access control protocol data unit, and the random access response;
12. the recovery configuration indication information is carried through the sub-header in the media access control protocol data unit, the control element in the media access control protocol data unit, and the service data unit;
13. the recovery configuration indication information is carried through the control element in the media access control protocol data unit, random access response and the service data unit;
14. the recovery configuration indication information is carried through the sub-header in the media access control protocol data unit, the control element in the media access control protocol data unit, the random access response and the service data unit.

Figure 8:
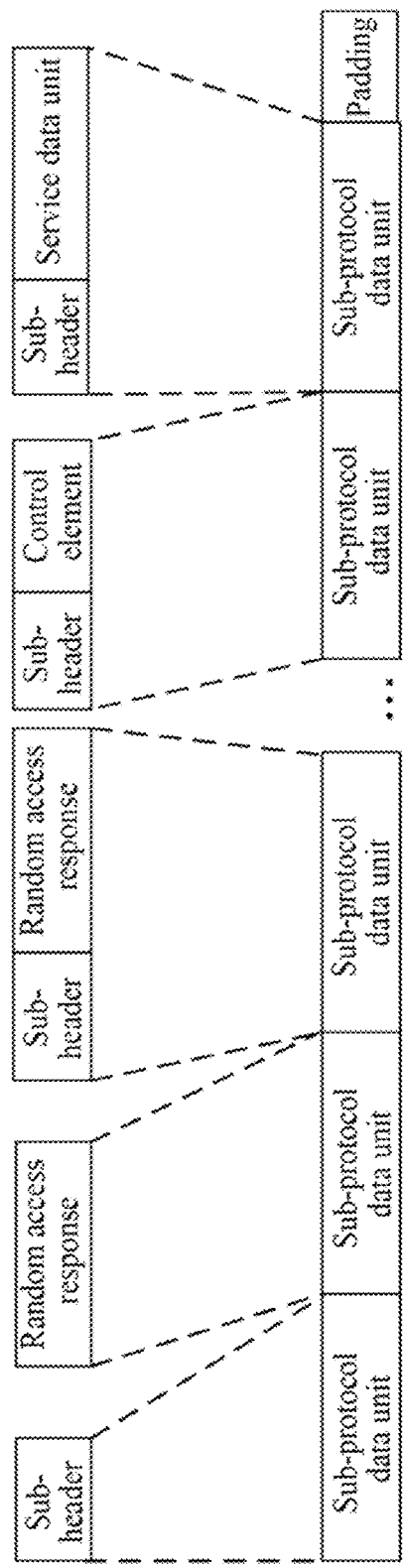
FIG. 8 shows a schematic structural diagram of a media access control protocol data unit.

FIG. 8 shows a schematic structural diagram of a medium access control protocol data unit. As shown in FIG. 8, the medium access control protocol data unit includes multiple sub-protocol data units (subPDU), and the sub-protocol data unit may include a sub-header; or, the sub-protocol data unit may include a random access response; or, the sub-protocol data unit may include a sub-header and a random access response; or, the sub-protocol data unit may include a sub-header and a control element; or, the sub-protocol data unit may include a sub-header and a service data unit. The competition resolution is one of the control elements.

Exemplarily, for the two-step random access procedure, MsgB can be used to carry the recovery configuration indication information; or for the four-step random access procedure, Msg2 and/or Msg4 can be used to carry the recovery configuration indication information.

2. For the specific meaning of the recovery configuration indication information, the specific illustrations are as follows:

The recovery configuration indication information may be used to indicate at least one of the following:
a recovery of a connection with a master node;
a recovery of a secondary cell configured by a master node;
a recovery of a connection with a secondary node;
a recovery of a secondary cell configured by a secondary node.

It should be understood that, the recovery configuration indication information may be used to indicate the recovery of the connection with the master node; or the recovery configuration indication information may be used to indicate the recovery of the secondary cell configured by the master node; or the recovery configuration indication information may be used to indicate the recovery of the connection with the secondary node; or, the recovery configuration indication information may be used to indicate the recovery of the secondary cell configured by the secondary node.

Or, the recovery configuration indication information may be used to indicate the recovery of the connection with the master node and the recovery of the secondary cell configured by the master node; or the recovery configuration indication information may be used to indicate the recovery of the connection with the master node and the recovery of the connection with the secondary node; or, the recovery configuration indication information may be used to indicate the recovery of the connection with the master node and the recovery of the secondary cell configured by the secondary node; or the recovery configuration indication information may be used to indicate the recovery of the secondary cell configured by the master node and the recovery of the connection with the secondary node; or the recovery configuration indication information may be used to indicate the recovery of the secondary cell configured by the master node and the recovery of the secondary cell configured by the secondary node; or the recovery configuration indication information may be used to indicate the recovery of the connection with the secondary node and the recovery of the secondary cell configured by the secondary node.

Or, the recovery configuration indication information may be used to indicate the recovery of the connection with the master node, the recovery of the secondary cell configured by the master node, and the recovery of the connection with the secondary node; or the recovery configuration indication information may be used to indicate the recovery of the connection with the master node, the recovery of the secondary cell configured by the master node and the recovery of the secondary cell configured by the secondary node; or, the recovery configuration indication information may be used to indicate the recovery of the secondary cell configured by the master node, the recovery of the connection with the secondary node, and the recovery of the secondary cell configured by the secondary node.

Or, the recovery configuration indication information may be used to indicate the recovery of the connection with the master node, the recovery of the secondary cell configured by the master node, the recovery of the connection with the secondary node, and the recovery of the secondary cell configured by the secondary node.

It should be noted that the specific meaning of the recovery configuration indication information needs to be set according to actual needs, and the present application does not limit the meaning of the recovery configuration indication information in the method for activating a connection performed each time.

In addition, in an actual application, at least one bit may be used to represent the recovery configuration indication information.

In an implementation, at least one bit is used to represent the recovery configuration indication information, which may specifically include at least one of the following:
if a value of the bit is a first preset value, the recovery configuration indication information is used to indicate the recovery of the connection with the master node;
if the value of the bit is a second preset value, the recovery configuration indication information is used to indicate the recovery of the connection with the secondary node;
if the value of the bit is a third preset value, the recovery configuration indication information is used to indicate the recovery of the secondary cell configured by the master node;
if the value of the bit is a fourth preset value, the recovery configuration indication information is used to indicate the recovery of the secondary cell configured by the secondary node.

As an example, the number of the bit representing the recovery configuration indication information is 1, and when the value of the bit is the first preset value, the recovery configuration indication information is used to indicate the recovery of the connection with the master node; when the value of the bit is the second preset value, the recovery configuration indication information is used to indicate the recovery of the connection with the secondary node. The first preset value is 0, and the second preset value is 1; or, the first preset value is 1, and the second preset value is 0.

As another example, the number of the bits representing the recovery configuration indication information is 2, and when the value of these 2 bits is the first preset value, the recovery configuration indication information is used to indicate the recovery of the connection with the master node; when the value of these 2 bits is the second preset value, the recovery configuration indication information is used to indicate the recovery of the connection with the secondary node; when the value of these 2 bits is the third preset value, the recovery configuration indication information is used to indicate the recovery of the secondary cell configured by the master node; when the value of these 2 bits is the fourth preset value, the recovery configuration indication information is used to indicate the recovery of the secondary cell configured by the secondary node. The first preset value is 00, the second preset value is 01, the third preset value is 10, and the fourth preset value is 11. The details are shown in Table 1:

TABLE 1

| 2 Bits | Recovery configuration indication information |
|---|---|
| 00 | Recovery of the connection with the master node |
| 01 | Recovery of the connection with the secondary node |
| 10 | Recovery of the secondary cell configured by the master node |
| 11 | Recovery of the secondary cell configured by the secondary node |

Or, optionally, different values of the at least one bit are respectively used to indicate at least one of the following information:
the recovery of the connection with the master node;
the recovery of the connection with the secondary node;
the recovery of the secondary cell configured by the master node;
the recovery of the secondary cell configured by the secondary node.

Still use 2 bits to represent the recovery configuration indication information. When the value of these 2 bits is the first preset value, the recovery configuration indication information is used to indicate the recovery of the connection with the master node; when the value of these 2 bits is the second preset value, the recovery configuration indication information is used to indicate the recovery of the connection with the secondary node and the recovery of the connection with the master node; when the value of these 2 bits is the third preset value, the recovery configuration indication information is used to indicate the recovery of the connection with the secondary node and the recovery of the secondary cell configured by the master node; when the value of these 2 bits is the fourth preset value, the recovery configuration indication information is used to indicate the recovery of the secondary cell configured by the secondary node and the recovery of the secondary cell configured by the master node. The first preset value is 00, the second preset value is 01, the third preset value is 10, and the fourth preset value is 11. The details are shown in Table 2:

TABLE 2

| 2 Bits | Recovery configuration indication information |
|---|---|
| 00 | Recovery of the connection with the master node |
| 01 | Recovery of the connection with the secondary node and recovery of the connection with the master node |
| 10 | Recovery of the connection with the secondary node and recovery of the secondary cell configured by the master node |
| 11 | Recovery of the secondary cell configured by the secondary node and recovery of the secondary cell configured by the master node |

And so on, the meaning of the recovery configuration indication information under various values when the number of bits representing the recovery configuration indication information is N can be obtained, N is an integer greater than or equal to 3, which will not be repeated here.

In another implementation, at least one bit is used to represent the recovery configuration indication information, which may specifically include at least one of the following:
the first preset bit is used to indicate whether to perform the recovery of the connection with the master node;
the second preset bit is used to indicate whether to perform the recovery of the connection with the secondary node;
the third preset bit is used to indicate whether to perform the recovery of the secondary cell configured by the master node;
the fourth preset bit is used to indicate whether to perform the recovery of the secondary cell configured by the secondary node.

Example 1: the number of the bits representing the recovery configuration indication information is 1. When the value of this bit is 1, the recovery configuration indication information is used to indicate the recovery of the connection with the master node; when the value of this bit is 0, the recovery configuration indication information is used to indicate not to recover the connection with the master node. Or, when the value of this bit is 0, the recovery configuration indication information is used to indicate the recovery of the connection with the master node; when the value of this bit is 1, the recovery configuration indication information is used to indicate not to recover the connection with the master node.

Example 2, the number of the bits of representing the recovery configuration indication information is 2. The first bit of these 2 bits is used as the first preset bit to indicate whether to perform the recovery of the connection with the master node, and the second bit of these 2 bits is used as the second preset bit to indicate whether to perform the recovery of the connection with the secondary node. When the value of the corresponding bit is 1, the recovery configuration indication information is used to indicate the recovery of the corresponding configuration; when the value of the bit is 0, the recovery configuration indication information is used to indicate not to recover the corresponding configuration. For example, when the value of the second preset bit is 1, the recovery configuration indication information is used to indicate the recovery of the connection with the secondary node; when the value of the bit is 0, the recovery configuration indication information is used to indicate not to recover the connection with the secondary node.

Example 3, the number of the bits representing the recovery configuration indication information is 4. The first bit of the 4 bits is used as the first preset bit to indicate whether to perform the recovery of the connection with the master node, and the second bit of the 4 bits is used as the second preset bit to indicate whether to perform the recovery of the connection with the secondary node; the third bit of the 4 bits is used as the third preset bit to indicate whether to perform the recovery of the secondary cell configured by the master node, the fourth bit of the 4 bits is used as the fourth preset bit to indicate whether to perform the recovery of the secondary cell configured by the secondary node. When the value of the corresponding bit is 1, the recovery configuration indication information is used to indicate to perform the recovery of the corresponding configuration; when the value of the bit is 0, the recovery configuration indication information is used to indicate not to recover the corresponding configuration. For example, when the value of the second preset bit is 1, the recovery configuration indication information is used to indicate the recovery of the connection with the secondary node; when the value of the bit is 0, the recovery configuration indication information is used to indicate not to recover the connection with the secondary node. The details are shown in Table 3:

TABLE 3

| 4 Bits | Recovery configuration indication information |
|---|---|
| 0001 | Recovery of the connection with the master node |
| 0010 | Recovery of the connection with the secondary node |
| 0100 | Recovery of the secondary cell configured by the master node |

TABLE 3-continued

| 4 Bits | Recovery configuration indication information |
|---|---|
| 1000 | Recovery of the secondary cell configured by the secondary node |

Referring to Table 3, "0011" corresponds to the recovery of the connection with the master node and the recovery of the connection with the secondary node, and "1011" corresponds to the recovery of the connection with the master node, the recovery of the connection with the secondary node, and the recovery of the secondary cell configured by the secondary node, etc., which will not be repeated here.

It should be noted that any of the above embodiments may be implemented separately, or may be implemented in any combination of at least two of the above embodiments, which is not limited.

It can be understood that, in the above embodiments, the operations and steps implemented by the terminal device may also be implemented by components (for example, a chip or a circuit) that can be used for the terminal device, which is not limited in the embodiments of the present application. The operations and steps implemented by the network device may also be implemented by components (for example, a chip or a circuit) used for the network device, which is not limited in the embodiment of the present application.

Figure 9:
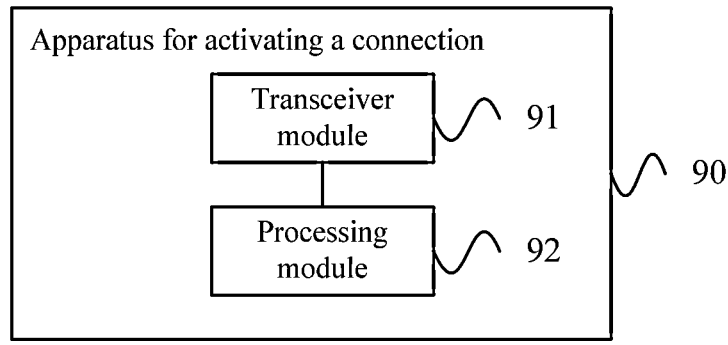
FIG. 9 is a schematic structural diagram of an apparatus for activating a connection according to an embodiment of the present application.

FIG. 9 is a schematic structural diagram of an apparatus for activating a connection according to an embodiment of the present application. As shown in FIG. 9, the apparatus for activating a connection 90 may be a terminal device, or a component of a terminal device (for example, an integrated circuit, a chip, etc.), or may be other communication modules for implementing any of the above embodiments which correspond to the operation of the terminal device. The apparatus for activating connection 90 in this embodiment includes: a transceiver module 91 and a processing module 92. The apparatus for activating a connection 90 in this embodiment can implement the solution of the terminal device in any of the above embodiments through the transceiver module 91 and the processing module 92, the implementation principles and technical effects are similar, and will not be repeated here.

Figure 10:
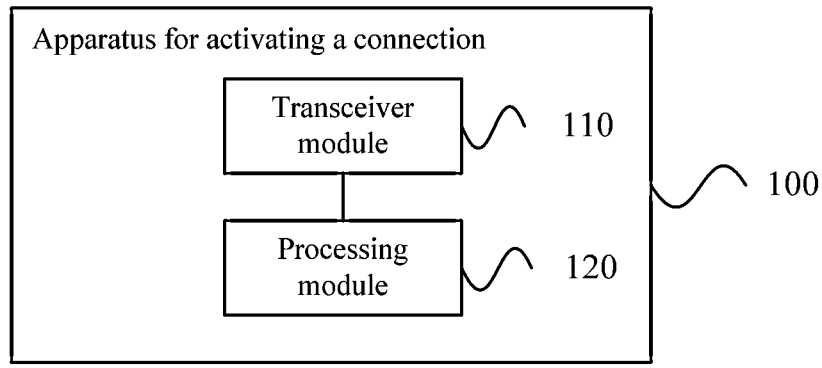
FIG. 10 is a schematic structural diagram of an apparatus for activating a connection according to another embodiment of the present application.

FIG. 10 is a schematic structural diagram of an apparatus for activating a connection according to another embodiment of the present application. As shown in FIG. 10, the apparatus for activating a connection 100 may be a network device, a component of the network device (for example, an integrated circuit, a chip, etc.), or may be other communication modules for implementing any of the above embodiments which corresponds to the operation of the network device. The apparatus for activating connection 100 in this embodiment includes: a transceiver module 110 and a processing module 120. The apparatus for activating connection 100 in this embodiment can implement the network device solution in any of the above embodiments through the transceiver module 110 and the processing module 120. The implementation principles and technical effects are similar and will not be repeated here.

Figure 11:
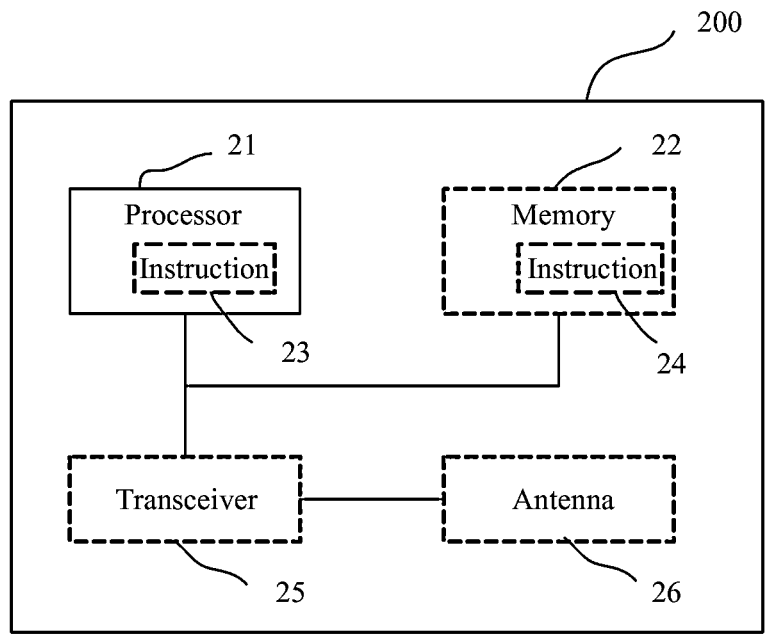
FIG. 11 is a schematic structural diagram of a communication device according to an embodiment of the present application.

FIG. 11 is a schematic structural diagram of a communication device according to an embodiment of the present application. As shown in FIG. 11, the communication device 200 described in this embodiment may be the terminal device (or a component that can be used for the terminal device) or a network device (or a component that can be used for the network device) mentioned in the foregoing method embodiment. The communication device 200 may be used to implement the method corresponding to the terminal device or the network device described in the above method embodiment, refer to the description in the above method embodiment for details.

The communication device 200 may include one or more processors 21, which may also be referred to as a processing unit, and may implement certain control or processing functions. The processor 21 may be a general-purpose processor or an application specific processor or the like. For example, it may be a baseband processor or a central processing unit. The baseband processor may be used to process the communication protocol and communication data, and the central processor may be used to control the communication device, execute the software program, and process the data of the software program.

In a possible design, the processor 21 may also store instructions 23 or data (for example, intermediate data). The instructions 23 may be executed by the processor 21, so that the communication device 200 executes the method corresponding to the terminal device or the network device described in the above method embodiment.

In yet another possible design, the communication device 200 may include a circuit, which may implement sending or receiving or communication functions in the foregoing method embodiments.

In a possible implementation, the communication device 200 may include one or more memories 22, having instructions 24 stored thereon, and the instructions may be executed on the processor 21, so that the communication device 200 executes the method described in the above method embodiments.

In a possible implementation, the memory 22 may also store data. The processor 21 and the memory 22 can be set separately or integrated together.

In a possible implementation, the communication device 200 may further include a transceiver 25 and/or an antenna 26. The processor 21 may be referred to as a processing unit, and controls the communication device 200 (terminal device or core network device or wireless access network device). The transceiver 25 may be called a transceiving unit, a transceiver, a transceiving circuit, or a transceiver, etc., and is used to implement the transceiving function of the communication device 200.

In one design, if the communication device 200 is used to implement operations corresponding to the terminal devices in the above embodiments, for example, the transceiver 25 may receive the recovery configuration indication information. The processor 21 may confirm, according to the recovery configuration indication information, whether to recover the radio resource control connection.

The specific implementation process of the processor 21 and the transceiver 25 may refer to the relevant description of the above embodiments, which will not be repeated here.

In another design, if the communication device 200 is used to implement operations corresponding to the network devices in the above embodiments, for example, the transceiver 25 may send the recovery configuration indication information. The processor 21 may confirm, according to the recovery configuration indication information, whether to recover the radio resource control connection.

The specific implementation process of the processor 21 and the transceiver 25 may refer to the relevant description of the above embodiments, which will not be repeated here.

The processor 21 and the transceiver 25 described in the present application may be implemented in an IC (Integrated Circuit), an analog integrated circuit, a RFIC (Radio Frequency Integrated Circuit), a mixed signal integrated circuit, an ASIC (Application Specific Integrated Circuit), a PCB (Printed Circuit Board), an electronic device, etc. The processor 21 and the transceiver 25 may also be manufactured by various integrated circuit technologies, such as a CMOS (Complementary Metal Oxide Semiconductor), an NMOS (N Metal-Oxide-Semiconductor), a PMOS (Positive channel Metal Oxide Semiconductor), a BJT (Bipolar Junction Transistor), a bipolar CMOS (BiCMOS), a silicon germanium (SiGe), a gallium arsenide (GaAs), and the like.

Although in the above description of the embodiments, the communication device is described by taking the terminal device or the network device as an example, the scope of the communication device described in the present application is not limited to the above terminal device or network device, and the structure of the communication device may not be limited to FIG. 11. The communication device may be a separate device or may be part of a larger device.

An embodiment of the present application also provides a communication system, including: a terminal device in any of the above method embodiments; and a network device in any of the above method embodiments.

The present application also provides a communication device, the device including: a memory, a processor, and a computer program stored in the memory and capable of running on the processor, and when the computer program is executed by the processor, the steps of the method described above is implemented.

The embodiment of the present application further provides a readable storage medium, having a computer program stored thereon, and when the computer program is executed, the method described above is implemented.

The embodiment of the present application further provides a program product, the program product includes a computer program code, when the computer program code runs on a computer, enable the computer to execute the methods described in the above various possible implementations.

The embodiment of the present application further provides a chip, including a memory and a processor, the memory is used to store a computer program, and the processor is configured to call and run the computer program from the memory, enable the device installed with the chip to execute the methods described in the above various possible implementations.

It should be understood that, although the steps in the flowchart in the above embodiments are displayed in sequence as indicated by the arrows, these steps are not necessarily executed in sequence in the order indicated by the arrows, unless explicitly stated in this description, there is no strict order limitation for the execution of these steps, and they may be executed in other orders. Moreover, at least part of the steps in figures may include multiple sub-steps or multiple stages, these sub-steps or stages are not necessarily executed at the same time, but may be executed at different times, and the order of execution is not necessarily sequential, but it may be executed in turn or alternately with other steps or sub-steps of other steps or at least a part of stages.

After considering the specification and practicing the disclosure disclosed herein, those skilled in the art will easily think of other embodiments of the present application. Embodiments of the present application are intended to cover any variations, uses, or adaptive changes of the present application, these variations, uses, or adaptive changes follow the general principles of the present application and include common knowledge or conventional technical means in the technical field that is not disclosed in the present application. The description and the embodiments are only regarded as exemplary, and the true scope and spirit of the present application are pointed out by the following claims.

It should be understood that the present application is not limited to the precise structure described above and shown in the drawings, and various modifications and changes may be performed without departing from its scope. The scope of the present application is only limited by the appended claims.

What is claimed is:

1. A method for activating a connection, which is applied to a terminal device in an inactive state, comprising the following steps:
    S20, receiving recovery configuration indication information from a network device, wherein the recovery configuration indication information indicates that the terminal device recovers, does not recover, or partially recovers a radio resource control connection; and
    S40, confirming, according to the recovery configuration indication information, whether to recover the radio resource control connection;
    wherein the recovery configuration indication information is used to indicate at least one of the following:
    a recovery of a secondary cell configured by a master node;
    a recovery of a secondary cell configured by a secondary node;
    not to recover a secondary cell configured by a master node;
    not to recover a secondary cell configured by a secondary node.

2. The method as claimed in claim 1, wherein the confirming, according to the recovery configuration indication information, whether to recover the radio resource control connection comprises:
    confirming whether to recover the radio resource control connection in a recovery process of the radio resource control connection; or
    confirming whether to recover the radio resource control connection in a random access process.

3. The method as claimed in claim 1, wherein the receiving the recovery configuration indication information comprises:
    receiving the recovery configuration indication information in a recovery process of the radio resource control connection; or
    receiving the recovery configuration indication information in a random access process; or
    receiving the recovery configuration indication information in a paging process.

4. The method as claimed in claim 1, wherein the recovery configuration indication information is carried by at least one of following ways:
    a radio resource control signaling;
    a sub-header in a media access control protocol data unit;
    a control element in a media access control protocol data unit;
    a random access response;
    a service data unit.

5. The method as claimed in claim 1, wherein the recovery configuration indication information is further used to indicate at least one of the following:
    a recovery of a connection with a master node;
    a recovery of a connection with a secondary node.

6. The method as claimed in claim 1, wherein the recovery configuration indication information is further used to indicate at least one of the following:
not to recover a connection with a master node;
not to recover a connection with a secondary node.

7. The method as claimed in claim 1, wherein the recovery configuration indication information is represented by at least one bit.

8. The method as claimed in claim 7, further comprising at least one of the following:
when a value of the bit is a first preset value, the recovery configuration indication information is used to indicate a recovery of a connection with a master node;
when the value of the bit is a second preset value, the recovery configuration indication information is used to indicate a recovery of a connection with a secondary node;
when the value of the bit is a third preset value, the recovery configuration indication information is used to indicate a recovery of a secondary cell configured by the master node;
when the value of the bit is a fourth preset value, the recovery configuration indication information is used to indicate a recovery of a secondary cell configured by the secondary node.

9. The method as claimed in claim 7, further comprising at least one of the following:
a first preset bit is used to indicate whether to perform a recovery of a connection with a master node;
a second preset bit is used to indicate whether to perform a recovery of a connection with a secondary node;
a third preset bit is used to indicate whether to perform a recovery of a secondary cell configured by the master node;
a fourth preset bit is used to indicate whether to perform a recovery of a secondary cell configured by the secondary node.

10. The method as claimed in claim 1, further comprising:
recovering the radio resource control connection.

11. The method as claimed in claim 10, wherein after the recovering the radio resource control connection, the method further comprises at least one of the following:
when there is uplink data needs to be transmitted, sending the uplink data;
receiving downlink data.

12. A communication device, comprising: a memory and a processor;
the memory is configured to store program instructions;
the processor is configured to call the program instructions in the memory to execute the method as claimed in claim 1.

13. A non-transitory readable storage medium, having a computer program stored thereon; wherein when the computer program is executed, the method as claimed in claim 1 is implemented.

14. A method for activating a connection, which is applied to a network device, comprising the following steps:
S10, sending recovery configuration indication information to a terminal device, wherein the recovery configuration indication information indicates that the terminal device recovers, does not recover, or partially recovers a radio resource control connection, and the terminal device is in an inactive state; and
S30, confirming, according to the recovery configuration indication information, whether to recover the radio resource control connection;
wherein the recovery configuration indication information is used to indicate at least one of the following:
a recovery of a secondary cell configured by a master node;
a recovery of a secondary cell configured by a secondary node;
not to recover a secondary cell configured by a master node;
not to recover a secondary cell configured by a secondary node.

15. The method as claimed in claim 14, wherein the confirming, according to the recovery configuration indication information, whether to recover the radio resource control connection comprises:
confirming whether to recover the radio resource control connection in a recovery process of the radio resource control connection; or
confirming whether to recover the radio resource control connection in a random access process.

16. The method as claimed in claim 14, wherein the sending the recovery configuration indication information comprises:
sending the recovery configuration indication information in a recovery process of the radio resource control connection; or
sending the recovery configuration indication information in a random access process; or
sending the recovery configuration indication information in a paging process.

17. The method as claimed in claim 14, wherein the recovery configuration indication information is carried by at least one of following ways:
a radio resource control signaling;
a sub-header in a media access control protocol data unit;
a control element in a media access control protocol data unit;
a random access response;
a service data unit.

18. The method as claimed in claim 14, wherein the recovery configuration indication information is further used to indicate at least one of the following:
a recovery of a connection with a master node;
a recovery of a connection with a secondary node.

19. The method as claimed in claim 14, wherein the recovery configuration indication information is further used to indicate at least one of the following:
not to recover a connection with a master node;
not to recover a connection with a secondary node.

20. The method as claimed in claim 14, wherein the recovery configuration indication information is represented by at least one bit.

21. The method as claimed in claim 20, further comprising at least one of the following:
when a value of the bit is a first preset value, the recovery configuration indication information is used to indicate a recovery of a connection with a master node;
when the value of the bit is a second preset value, the recovery configuration indication information is used to indicate a recovery of a connection with a secondary node;
when the value of the bit is a third preset value, the recovery configuration indication information is used to indicate a recovery of a secondary cell configured by the master node;

when the value of the bit is a fourth preset value, the recovery configuration indication information is used to indicate a recovery of a secondary cell configured by the secondary node.

22. The method as claimed in claim 20, further comprising at least one of the following:
a first preset bit is used to indicate whether to perform a recovery of a connection with a master node;
a second preset bit is used to indicate whether to perform a recovery of a connection with a secondary node;
a third preset bit is used to indicate whether to perform a recovery of a secondary cell configured by the master node;
a fourth preset bit is used to indicate whether to perform a recovery of a secondary cell configured by the secondary node.

23. The method as claimed in claim 14, further comprising:
recovering the radio resource control connection.

24. The method as claimed in claim 23, wherein after the recovering the radio resource control connection, the method further comprises at least one of the following:
when there is downlink data needs to be transmitted, sending the downlink data;
receiving uplink data.

25. A communication system, comprising:
a terminal device for implementing the following steps:
receiving recovery configuration indication information from a network device, wherein the recovery configuration indication information indicates that the terminal device recovers, does not recover, or partially recovers a radio resource control connection; and
confirming, according to the recovery configuration indication information, whether to recover the radio resource control connection;
the network device for implementing the following steps:
sending the recovery configuration indication information to the terminal device, wherein the recovery configuration indication information indicates that the terminal device recovers, does not recover, or partially recovers the radio resource control connection, and the terminal device is in an inactive state; and
confirming, according to the recovery configuration indication information, whether to recover the radio resource control connection;
wherein the recovery configuration indication information is used to indicate at least one of the following:
a recovery of a secondary cell configured by a master node;
a recovery of a secondary cell configured by a secondary node;
not to recover a secondary cell configured by a master node;
not to recover a secondary cell configured by a secondary node.

* * * * *